(12) United States Patent
Bunod et al.

(10) Patent No.: US 8,381,577 B2
(45) Date of Patent: Feb. 26, 2013

(54) METHOD AND DEVICE FOR TESTING A CONTAINER FOR LEAKS

(75) Inventors: Philippe Bunod, Annecy (FR); Sylvain Colliard, Chambery (FR)

(73) Assignee: Alcatel Lucent, Paris (FR)

( * ) Notice: Subject to any disclaimer, the term of this patent is extended or adjusted under 35 U.S.C. 154(b) by 278 days.

(21) Appl. No.: 12/736,367

(22) PCT Filed: Apr. 3, 2009

(86) PCT No.: PCT/FR2009/050567
§ 371 (c)(1),
(2), (4) Date: Nov. 15, 2010

(87) PCT Pub. No.: WO2009/136037
PCT Pub. Date: Nov. 12, 2009

(65) Prior Publication Data
US 2011/0056274 A1    Mar. 10, 2011

(30) Foreign Application Priority Data
Apr. 3, 2008  (FR) ...................... 08 01851

(51) Int. Cl.
*G01M 3/04* (2006.01)
(52) U.S. Cl. .................................... 73/40.5 A
(58) Field of Classification Search ............... 73/40.5 A, 73/861.95, 40.7, 49.2
See application file for complete search history.

(56) References Cited

U.S. PATENT DOCUMENTS

| | | | |
|---|---|---|---|
| 5,361,626 A | 11/1994 | Colligan et al. | |
| 5,939,619 A | 8/1999 | Achter et al. | |
| 6,622,545 B2 * | 9/2003 | Weldon et al. | 73/49.7 |
| 6,742,384 B2 * | 6/2004 | Avila | 73/40.7 |
| 6,820,466 B2 * | 11/2004 | Streib | 73/49.2 |
| 7,290,439 B2 * | 11/2007 | Perkins et al. | 73/40.7 |
| 2002/0142469 A1 | 10/2002 | Li et al. | |

FOREIGN PATENT DOCUMENTS

| | | |
|---|---|---|
| FR | 2688307 | 9/1993 |
| GB | 2345969 | 7/2000 |
| WO | WO 2006/032591 | 3/2006 |

OTHER PUBLICATIONS

Anonymous: Photo Ionisation Detector (PID); Catalogue, [Online] Nov. 19, 2007; XP002556988; Retrieved from the Internet: URL:http://www.apollounion.com/eweb/download/456.pdf.

* cited by examiner

*Primary Examiner* — Jewel V Thompson
(74) *Attorney, Agent, or Firm* — Carmen Patti Law Group, LLC

(57) ABSTRACT

A leak-testing method for a test container comprises measuring background noise within a chamber at atmospheric pressure with a trace sensor of volatile organic compounds that exhibit a measurement sensitivity less than or on the order of 1 ppb. Pollution is removed from an internal atmosphere of the chamber when the measurement of the background noise is greater than a predetermined threshold. The internal atmosphere of the chamber is mixed to homogenize a composition of the internal atmosphere receiving a container that defines a bounded internal space within which a volatile organic compound is present.

A concentration of volatile organic compounds is measured within the atmospheric pressure chamber with the trace sensor of the volatile organic compounds. The measurement of the background noise is compared to the measurement of the concentration of the volatile organic compounds to detect the leak in the test container.

10 Claims, 2 Drawing Sheets

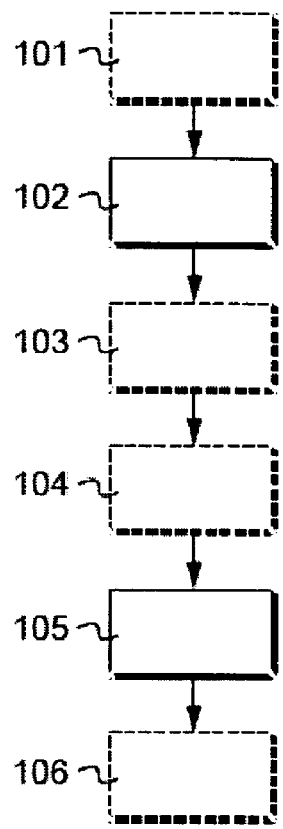
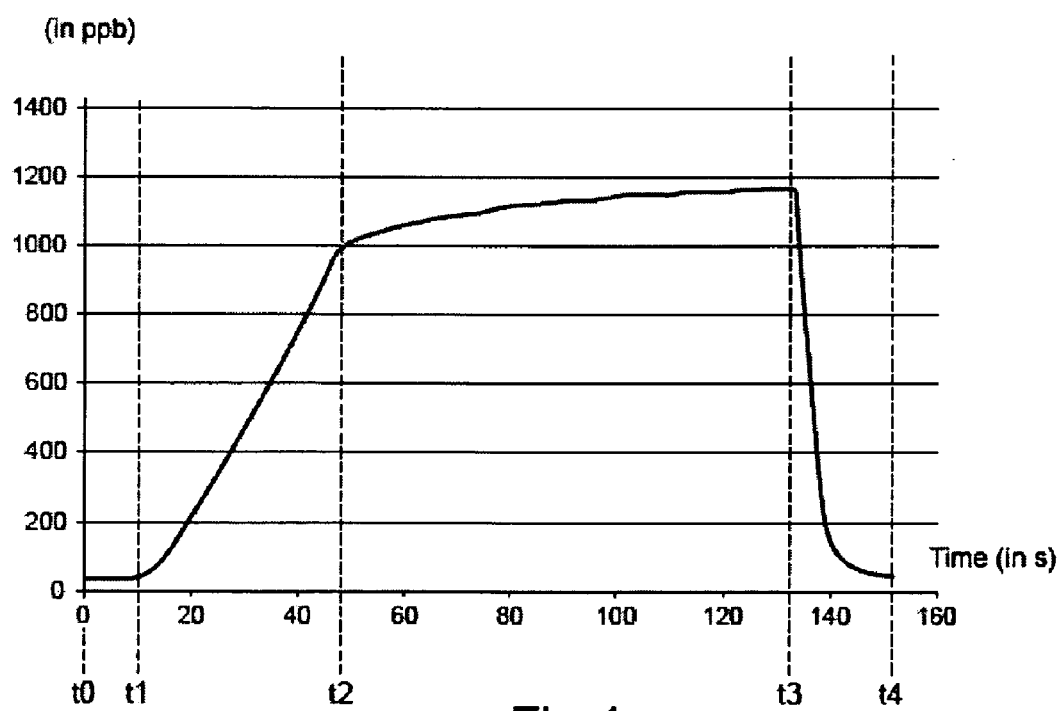

METHOD AND DEVICE FOR TESTING A CONTAINER FOR LEAKS

BACKGROUND

The present invention concerns testing a container for leaks during an industrial fabrication process, and the device for implementing it.

Testing containers for leaks may be carried out using different detection methods.

A first known testing method is the method known as a "pressure variation test" which begins by establishing a determined excess pressure within the test container.

Next, the test container is plugged up, and the change in its internal pressure over time is measured. If there is a leak, the internal pressure decreases, and the measurement of this pressure decrease can be used to deduce the value of the leaks.

According to one variant of the method, a gas flow is injected into the test container so as to maintain the high internal pressure within the container. The gas flow value necessary to maintain this balance makes it possible to deduce the corresponding leak flows.

Another variant of the method begins by establishing a determined low pressure within the test container, then plugging up the container. In the event of a leak, the pressure increases and the measurement of this pressure increase is used to deduce the value of a leak.

These methods are simple to implement and inexpensive. However, the sensitivity of the measurement is limited, and depends on the particular conditions of the method's implementation.

Thus, the sensitivity depends on the volume of the test container, which is particularly harmful for test containers which have flexible walls and whose internal volume may vary over the course of the testing method.

Additionally, the time needed to conduct the measurement is too long for it to be integrated into a fast-paced industrial process, such as in the field of automobile manufacturing. Furthermore, the result of the measurement is sensitive to variations in the container's temperature.

The method for testing the leakproofness of test containers by detecting leaks using helium is also known.

To do so, an excess pressure of helium is established within the container. Next, it is detected whether helium is present within the ambient atmosphere surrounding the container using a sniffer connected to a leak sensor. The presence of helium is representative of a leak, and therefore of a leakproofness defect on the container.

The drawback of this method is that its usage is restricted to locating large leaks and that the sensitivity of the method is limited by the relatively high background noise of helium within the ambient atmosphere of the test room (the natural residual concentration of helium is generally above 5 ppm). Furthermore, the method is difficult to implement within an industrial process. Additionally, the use of helium is costly.

According to one variant embodiment of the helium detection method, the test container is placed within a sealed chamber connected both to a pumping room establishing an appropriate vacuum and to a helium leak sensor.

The internal space of the container is connected to a helium pressurization device, and leaks are sought out by detecting whether any helium is present within the internal atmosphere of the chamber, via the leak sensor.

This helium leak detection method is a reliable, reproducible, high-sensitivity test for carrying out a precise quantitative measurement, which may be incorporated into an industrial process. However, its implementation is restrictive.

First, the chamber itself must be made airtight so as to be able to support a vacuum. Next, the pumping devices must be suitable for the volume of the chamber to which they are connected. Thus, for high-volume test containers, large pumping units must be provided, which represents major investments and high maintenance fees.

Another drawback is that the sensitivity of the method is limited by the fact that helium has a tendency to very easily adsorb onto the surfaces of test containers, as well as onto the surfaces of the chamber receiving the container.

Consequently, removing pollution from the chambers after detecting containers that have a leak may be relatively slow and impede the industrial process.

SUMMARY

The present invention therefore aims to propose a less costly and more sensitive alternative, which may therefore be faster, applicable to industrial processes, even fast-paced ones, enabling simple and reliable implication.

To that end, one object of the invention is a method for testing a test container for leaks, comprising:
  a first step during which background noise is measured within a chamber at atmospheric pressure, with a trace sensor of volatile organic compounds exhibiting a measurement sensitivity less than or on the order of 1 ppb,
  an intermediate step of removing pollution from the chamber's internal atmosphere when the measurement of the background noise is greater than a predetermined threshold, and
  a second step during which the internal atmosphere of the chamber is mixed so as to homogenize the composition of said internal atmosphere receiving a container defining a bounded internal space within which a volatile organic compound is present, a concentration of volatile organic compounds is measured within the atmospheric-pressure chamber with said trace sensor of volatile organic compounds, and the measurement of the background noise is compared with the measurement of the concentration of volatile organic compounds, so as to detect a leak in said test container.

Volatile organic compounds, such as acetone, propane, butane, isobutene (or isobutylene or methyl-2 propene), ethanol, methanol, benzene, butene, propene, ethylene, or PGMEA (or monomethylic ether acetate of propylene glycol or 1-methoxy-2-acetoxypropane or 1-methoxy-2-propanol acetate) exhibit many benefits.

These gases, in gas form within the atmosphere, comprise carbon atoms. They are extremely volatile and have low adherence to surfaces, enabling them to be easily discharged. It is therefore fast and simple to remove pollution from the chamber when the leak has been detected or when the background noise is too high. Furthermore, they exhibit the advantage of already being present in certain industrial containers which are desired to be tested, such as aerosol cans or lighters. Additionally, these gases are already present in low residual concentrations within the ambient air (on the order of 10 ppb). Furthermore, simple sensors of volatile organic compounds exhibiting a very high measurement sensitivity, on the order of 1 ppb or below, are available off-the-shelf.

Thus, the use of volatile organic compounds is advantageous because:
  sensitive measurements may be taken easily, quickly, and at low cost, meaning without a mass spectrometer but rather through the use of a corresponding high-sensitivity trace sensor of volatile organic compounds and a mixing means for homogenizing the internal environment of the chamber so as to more easily detect a variation in trace gases, and the internal atmosphere of the chamber may be decontaminated easily and at a low cost, meaning without a pumping device, whenever the measurement of the background noise is greater than a predetermined threshold.

For example, for a single internal volume of the chamber on the order of 100 liters, the concentration of the background noise is on the order of 5000 ppb for a 100% helium trace gas, 500 ppb for a trace gas comprising 5% hydrogen and 50 ppb for a trace gas comprising one or more volatile organic compounds. Furthermore, these measurements are obtained after only 4 seconds' accumulation of such gas within said volume, as opposed to 48 seconds for a trace gas comprising 5% hydrogen and 24 seconds for a helium trace gas. Consequently, the measurement obtained is six times faster than detection by a helium trace gas and ten times faster than detection by a hydrogen trace gas.

The testing method may comprise one or more of the following characteristics:

the testing method comprises an additional intermediate step before the second step, during which a trace gas comprising a volatile organic compound is injected into said container at a gas pressure greater than the atmospheric pressure, the trace gas is a neutral gas such as nitrogen, with a low concentration, such as below 6%, preferentially between 1% and 6%, and advantageously equal to 5.9%, of at least one volatile organic compound, particularly isobutene, the testing method comprises a preparatory step of calibration during which the trace sensor of volatile organic compounds is calibrated with respect to the volume of the chamber, by injecting a calibrated quantity of volatile organic compounds into the chamber.

The invention also pertains to a device for testing a test container for leaks, comprising an atmospheric-pressure chamber intended to receive a test container, and comprising a trace sensor of volatile organic compounds exhibiting a measurement sensitivity less than or on the order of 1 ppb, with a fluid connection to the chamber, a decontamination means, a means for mixing the gases, and a processing unit capable of comparing the measurement results of said sensor in order to provide information on the leakproofness of said test container and capable of implementing the testing method as described above.

The testing method may comprise one or more of the following characteristics:

the testing device comprises a pressurization system for injecting into said test container a trace gas comprising a volatile organic compound, at a pressure greater than the atmospheric pressure of the chamber, for implementing the testing method as described above, the decontamination means comprises a decontamination chamber equipped with a valve and a volatile organic compound filter, the valve being capable of isolating the internal atmosphere of the chamber from said filter, for implementing the step of decontamination of the testing method as described above, the decontamination means comprise an additional decontamination chamber successively comprising a valve, a gas driving means, such as a fan, and a volatile organic compound filter, the two decontamination chambers being configured so as to be able to circulate a cleaning gas from one gas inlet of the first decontamination chamber to a gas outlet of a second decontamination chamber, the chamber comprises a bypass line onto which the trace sensor of volatile organic compounds is connected, and which particularly comprises a gas flow means, such as a fan.

BRIEF DESCRIPTION OF THE DRAWINGS

Other advantages and characteristics shall become apparent upon reading the description of the invention, as well as the attached drawings, in which:

FIG. 3 depicts a flowchart of a leak testing method of said testing device, and FIG. 4 is a graph depicting a concentration of trace gases over time within the leak testing device of FIG. 2.

DETAILED DESCRIPTION

In these figures, identical elements are given the same reference numbers. For reasons of clarity, the stages of the measurement method are numbered starting from 100.

The present invention pertains to a leak testing method and device in view of testing the test container for leaks during an industrial fabrication process.

A first application pertains to testing the leakproofness of test containers designed to enclose a body and solid, liquid, and/or gas form which naturally releases a volatile organic compound.

Containers that may be cited include an electrical transformer or circuit breaker intended to enclose an industrial oil which continuously releases one or more volatile organic compounds, or a tube intended to contain a cosmetic that releases a volatile organic compound, such as a tube of lipstick.

A second application pertains to testing the leakproofness of test containers comprising one or more pipes in which a fluid circulates or a space in which a fluid is stored, such as a liquid, a gas, or a mixture of liquids and gases.

Containers that may be cited as examples include a fuel tank or thermal exchanger, particularly for an air-conditioning system.

Naturally, the testing method and device apply to any container for fluids and/or solids equipped with at least one bounded internal space whose leakproofness is meant to be checked by detecting whether a leak is present.

The method and device for testing also apply to simultaneously testing multiple distinct containers.

Figure 1:
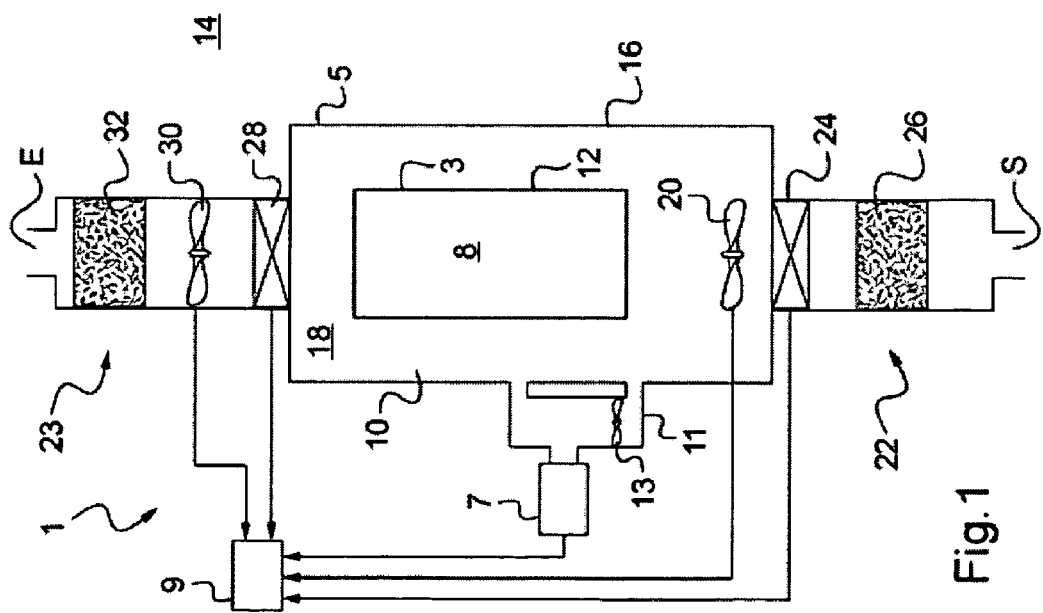
FIG. 1 is a diagram of a leak testing device.

FIG. 1 depicts a leak testing device 1 constructed according to a first embodiment.

In this first example embodiment, the test container 3 is designed to enclose a body in a solid, liquid, and/or gas form, which, owing to its composition, naturally and continually releases a volatile organic compound.

The testing device 1 comprises a chamber 5 intended to receive the test container 3, a trace sensor 7 of volatile organic compounds, a decontamination means, and a processing unit 9 capable of comparing the measurement results of said sensor 7 in order to provide information on the leakproofness of said test container 3.

The term trace sensor refers to a sensor which possesses high sensitivity, making it possible to detect the presence of volatile organic compounds even if they are present in a concentration less than the 0.1 ppm. For example, a trace sensor of volatile organic compounds 7 uses the principle of photoionization ("Photo-Ionization Detector" or "PID").

Advantageously, the internal atmosphere 10 of the chamber 5 may be on the order of the ambient atmospheric pressure of the test room 14.

Thus, the chamber 5 need only satisfy the particular mechanical and leakproofness stresses required for a vacuum. Additionally, expensive pumping installations are not necessary to create a vacuum within the chamber 5.

This also has an impact on the cost of the chamber 5, because, as the mechanical stresses exerted onto these walls 16 of the chamber 5 are the same as those exerted under normal atmospheric conditions, the walls 16 may be formed, for example, by a thin metallic envelope.

Naturally, the walls 16 of the chamber 5 preferentially comprise a material whose behavior is neutral with respect to volatile organic compounds, and which does not release, adsorb, or absorb any volatile organic compounds.

Furthermore, as the leakproofness conditions of the chamber 5 are minimal (it is simply sought to have a constant internal temperature 10), as an alternative a deformable or flexible wall 16, for example one made of plastic, may be provided, such as a tarp.

The use of a tarp is particularly suitable for testing bulky containers 3 for leaks and enables easy adaptation to containers 3 that exhibit different dimensions or forms.

The internal atmosphere 10 of the chamber 5 has a fluid connection to the trace sensor 7 so as to be able to detect the presence of volatile organic compounds within the chamber 5.

According to one variant embodiment, the chamber 5 further comprises a bypass line 11 onto which a trace sensor of volatile organic compounds 7 is connected.

The bypass line 11 comprises at least one gas flow means 13, such as a fan. It is thereby ensured that the internal atmosphere 10 of the chamber 5 is circulating towards the trace sensor 7 to be measured.

Preferentially, the gas flow means 13 is configured so that the flow of gases at the trace sensor 7's inlet is laminar-flow.

The trace sensor 7 is capable of measuring, in real time, at least one type of volatile organic compound whenever it is present in a concentration less than 0.1 ppm (parts per million, or $10^{-6}$) with a sensitivity on the order of or less than 1 ppb.

Preferentially, the sensor 7 even possesses a greater sensitivity such that the presence of all of the volatile organic compounds, such as acetone, butane, methanol, ethanol, isobutene, propane, benzene, butene, propane, ethylene, or PGMEA may be detected with a concentration of ppb (parts per billion, or $10^{-9}$) or even ppt (parts per trillion, or $10^{-12}$).

Furthermore, the sensor 7 is connected to the processing unit 9 to transmit to that unit an outlet signal representative of the measurement taken within the chamber 5.

It is therefore understood that the volatile organic compound contained within the container 3 may be detected in the event of a leak fault in the container 3 which will cause a leak of trace gases detectable by the sensor 7.

Advantageously, the volume of the chamber 5 has dimensions slightly greater than that of the test container 3, in order to reduce the measurement volume 18 of the chamber 5 that may contain the volatile organic compound coming from a leak and thereby to improve the response time and measurement sensitivity, the measurement volume 18 being equal to the internal volume of the chamber 5 from which the volume of the container 3 has been subtracted.

The testing device comprises a gas mixing means 20, such as a fan so that the atmosphere in the measurement volume 18 may be mixed together. This also contribute to improving response time, because the volatile organic compound leaking into the chamber 5 is kept from staying localized near the leakproofness fault that caused the leak. Rather, this compound is spread out by the mixing means 20 within the internal atmosphere 10 of the chamber 5, making it possible to take an even measurement and to detect variations in background noise concentrations.

The decontamination means makes it possible to de-pollute the internal atmosphere 10 of the chamber 5, in order to reduce the background noise by implementing a step of decontamination. For example, the concentration of volatile organic compounds is reduced to a value less than 10 ppb, so that the residual concentration of the volatile organic compounds is on the order of the ones present in the ambient air.

The measurement of the background noise it intended to quantify an initial concentration of volatile organic compounds present within the measurement volume 18 of the chamber 5 and which is not related to a leakproofness fault in the test container 3.

A step of decontamination is carried out before conducting a measurement testing the leakproofness when the background noise measurement is greater than a predetermined threshold. A step of decontamination may also be carried out after having conducted a measurement, but before having removed the test container 3, preferentially when a leak has been detected.

The decontamination means is equipped with a decontamination chamber 22 comprising a valve 24 and a volatile organic compound filter 26. The valve 24 has a fluid connection to the chamber 5 so as to be able to isolate the internal atmosphere 10 of the chamber 5 from the filter 26 prior to the valve 24.

FIG. 1 depicts (at the bottom of the chamber 5) a decontamination means according to this first embodiment.

Thus, during the implementation of a step of decontamination with the testing device 1 constructed according to this first embodiment, the valve 24 is opened so that the filter 26 is no longer isolated from the internal atmosphere 10 of the chamber 5 but rather is in contact with it.

The internal atmosphere 10 of the chamber 5 is simultaneously mixed using the gas mixing means 20, in order to effectively de-pollute the chamber.

The filter 26 comprises, for example, zeolites or activated carbon, preferentially thermally renewable, in order to trap any volatile organic compounds.

Pollution removal may thereby be conducted on the internal atmosphere 10 of the chamber 5 between each container 3 leak test, which improves the sensitivity of the measurement.

According to a second embodiment, the decontamination means comprises an additional decontamination chamber 23.

The two decontamination chambers 22, 23 each comprise a valve 24, 28 connected to the chamber 5 upstream of a volatile organic compound filter 26, 32.

The additional decontamination chamber 23 additionally comprises a gas driving means 30, such as a fan, placed between the valve 28 and the volatile organic compound filter 32 (as depicted at the top of FIG. 1).

The two pollution renewable chambers 22, 23 are preferentially arranged facing one another so as to be able to circulate a cleaning gas from a gas inlet E connected upstream of the filter 32 into the decontamination chamber 23 towards a gas outlet S connected downstream of the filter 26 out from the decontamination chamber 22.

The cleaning gas is a gas free from volatile organic compounds, such as nitrogen. The gas is injected into the gas inlet E.

Thus, when a decontamination step is implemented with the testing device 1 constructed according to this second embodiment, the valves 24 and 28 are simultaneously opened so that the filters 26 and 32 are no longer isolated from the internal atmosphere 10 of the chamber 5, but rather are in contact with it.

The gas driving means 30 arranged between the valve 28 and a filter 32 is then turned on to circulate the cleaning gas from the gas inlet E of the decontamination chamber 23 toward the gas outlet S of the decontamination chamber 22.

The gas thereby successively passes through the filter 32, from which exits filtered of any volatile organic compound impurities, then passes through the internal atmosphere 10 of the chamber 5.

The cleaning gas then flows from the second decontamination chamber 22, taking with it any traces of volatile organic compounds coming from the internal atmosphere 10 of the chamber 5. The volatile organic compounds are then trapped by the filter 26.

Furthermore, the decontamination means may comprise a means for heating the container 3 and the walls 16 of the chamber 5 when they are metallic, in order to facilitate and accelerate the degassing of the volatile organic compounds from the walls 16 and thereby to reduce the residual quantity of volatile organic compounds.

It is also conceivable that the decontamination means is constructed by a gas injection means free from volatile organic compounds in order to sweep the internal atmosphere 10 of the chamber 5 (not depicted).

The decontamination means is advantageously connected to the processing unit 9, which is further configured to order its operation according to the proceeding of the steps of the testing method.

Figure 2:
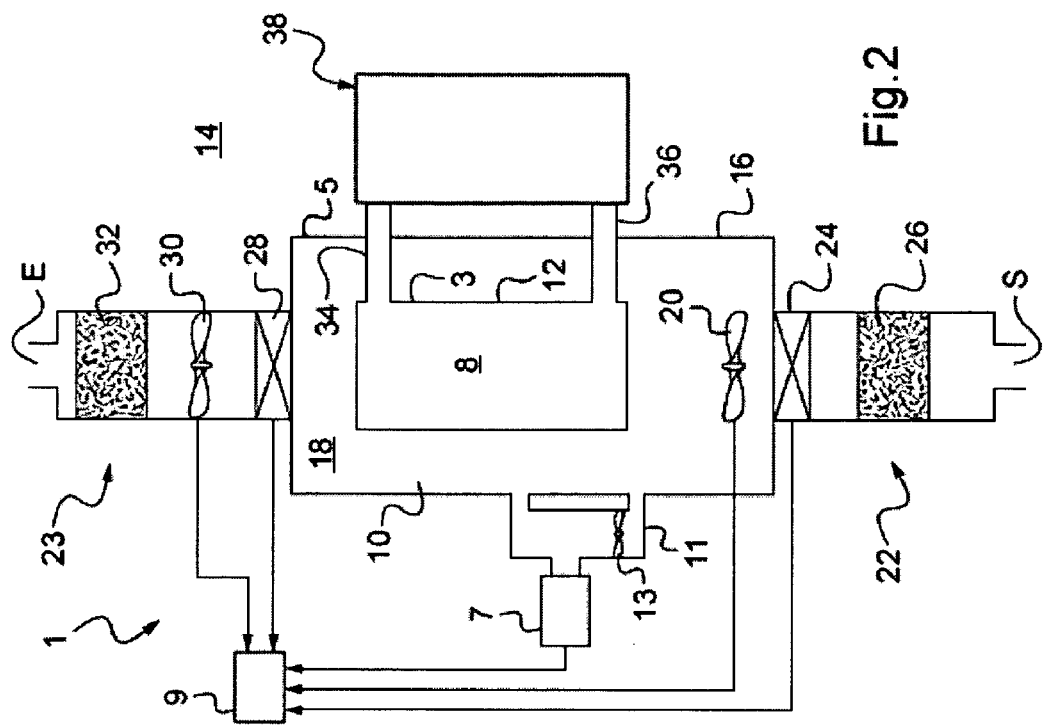
FIG. 2 is a diagram of one variant embodiment of the leak testing device of FIG. 1

FIG. 2 depicts a variant embodiment of the testing device 1 of FIG. 1.

This variant embodiment applies to a test container 3 for fluids and/or solids comprising at least one internal space 8 capable of receiving a fluid and/or solid, bounded by a wall 12 in which it is sought to detect a leakproofness defect by detecting if a leak is present whenever a trace gas is injected into the container 3.

In this example, the test container 3 is a thermal exchanger such as a motor's cooling radiator, a heating radiator, or an oil or fuel cooler or an air conditioner's evaporator/condenser.

It comprises an inlet line 34 and an outlet line 36.

In addition to the elements already described, the leak testing device 1 comprises a pressurization system 38 for injecting a tracer gas comprising a volatile organic compound into the container 3, at a pressure greater than the atmospheric pressure of the chamber 5.

The pressurization system 38 has a fluid connection both to the inlet 34 of the container 3 placed within the chamber 5 and the outlet 36 to inject the tracer gas into the internal space 8 of the container 3 at a pressure greater than the atmospheric pressure of the chamber 5, meaning greater than about 1013 hPa.

The processing unit 9 is connected to the pressurization system 38 so as to order a tracer gas injection cycle into the container 3.

In order to reduce volatile organic compound consumption, it is advantageously provided that the pressurization system 38 comprises a means of recycling the tracer gas.

It may also be provided that the pressurization system 38 comprises a means of processing the tracer gas in order to avoid polluting the ambient atmosphere of the test room 14.

It is therefore understood that, a tracer gas containing both a neutral gas and at least one volatile organic compound is injected at a pressure greater than the atmospheric pressure within the container 3, this tracer gas, and in particular the volatile organic compound, may be detected by the sensor 7 if there is a leakproofness defect within the container 3.

In operation, the processing unit 9 is configured to process and use the sensor's 7 measurement results and to implement the measurement method 100.

According to one particular embodiment, the processing unit 9 is further configured to send a signal representative of the state of progress of the testing method 100 to a test unit of industrial fabrication process, so as to manage the pace of the test containers 3.

The flowchart in FIG. 3 illustrates the method for testing for leaks 100.

In the testing method 100, a preparatory calibration step 101 is first provided during which the trace sensor 7 of volatile organic compounds is calibrated with respect to the chamber 5, by injecting a calibrated quantity of volatile organic compounds into the chamber 5.

The preparatory calibration step 101 is used to compensate for any deviation in measurement by the trace sensor 7 of volatile organic compounds with respect to the chamber 5.

The preparatory calibration step 101 is preferentially conducted after a change to the testing device 1, or after a predefined number of tested containers 3.

Next, the test container 3 is placed within the chamber 5.

Afterward, in a first step 102 of the testing method 100, background noise within the chamber 5 at atmospheric pressure is measured, with the volatile organic compound trace sensor 7.

The measurement of the background noise is the measurement of the initial concentration of volatile organic compounds present within the chamber 5.

Next, the internal atmosphere 10 of the chamber 5 is advantageously decontaminated during an intermediate step of decontamination 103 (FIG. 3).

In order to decrease the number of steps in the test method 100 and reduce the detection time, the internal atmosphere 10 of the chamber 5 is decontaminated only when the background noise is greater than a predetermined threshold, in order to guarantee at the measurement has an acceptable signal-to-noise ratio. The intermediate step of decontamination 103 is implemented until a level of background noise is obtained that makes it possible to conduct a significant measurement of the volatile organic compound concentration.

Next, according to the first embodiment of the test method 100 for a container 3 comprising one or more pipes in which a fluid circulates or a space in which a fluid is stored, such as a tank or thermal exchanger, the testing method 100 implements an additional intermediate step 104, during which the tracer gas is injected into said container 3 at a gas pressure greater than atmospheric pressure.

The tracer gas is a neutral gas such as nitrogen, with a low concentration, such as below 6%, preferentially between 1% and 6%, and advantageously equal to 5.9%, of at least one volatile organic compound, particularly isobutene, Thus, the concentration of isobutene is less than the flammability threshold.

Provided that certain particular testing conditions are met, for example that the restrictions of so-called "ATEX" regulations are met, a tracer gas comprising a majority concentration of at least one volatile organic compounds may also be provided.

According to a second embodiment of the testing method 100 (a testing device of embodiment 1 of FIG. 1), said container 3 already comprises within its internal space a body degassing, owing to its composition, a volatile organic compound. For example, the container is an electrical transformer or a circuit breaker and comprises an industrial oil based on volatile organic compounds. According to another example, the container is a tube of lipstick and comprises a cosmetic based on volatile organic compounds.

According to another example, the container 3 comprises an internal space 8 for fluids, such as a tank or thermal exchanger, which had previously been filled with a tracer gas comprising a volatile organic compound.

Next, in both embodiments of the testing method 100, the gas mixing means 20 is started in order to obtain a permanent gas flow regime and thereby to quickly detect the presence of a leak, if there is one.

Afterward, during a second step 105, a concentration of volatile organic compounds within the chamber 5 at atmospheric pressure receiving said container 3 is measured with the volatile organic compound trace sensor 7, and the background noise measurement is compared with the measurement of the volatile organic compound concentration, so as to detect a leak inside the test container 3.

During the measurement, the internal atmosphere 10 of the chamber 5 is mixed by the mixing means 20 in order to obtain a correct, stable, and fast measurement.

Advantageously, a variation in the volatile organic compound concentration is measured based on a predefined deviation in time, so as to determine the slope of the measured curve.

The slope of the curve is proportionate to the total leak flow of the walls 12 of the container 3. The slope is also a function of the measurement volume 18. It is therefore relatively easy to obtain, based on the calculation of the slope, a quantitative value of the container's leak flow 3. The level of leakproofness defect within the container 3 may thereby be estimated.

Whenever the slope is greater than a predetermined threshold, the container 3 is sent back for refurbishment or repair.

A leak is therefore a noted leakproofness effect in the event that the volatile organic compound concentration is greater than the background noise, with an increase over time greater than a predefined threshold, defining a leakproofness criterion.

If after a predetermined measurement period, no significant change in the volatile organic compound concentration is detected, the measurement is stopped and it is concluded that the test container 3 is acceptable in light of the leakproofness criterion.

If, on the other hand, the variation in the volatile organic compound concentration is greater than the predefined threshold, it is decided that a leak is present, and therefore that the container 3 has a leakproofness defect. This container may then be removed from the industrial manufacturing process.

Next, whenever it is believed that the leak rate is known with sufficient accuracy, the testing method 100 is terminated.

An additional step of decontamination 106 from the chamber 5 may be provided whenever a leak has been detected, before removing the container 3 from the chamber 5.

The step of decontamination 106 is implemented until the volatile organic compound concentration is lowered to a value equivalent to that the existing within the test room 14.

The processing unit 9 then sends a signal to the industrial manufacturing process control unit, in order to tell it that the leak testing device 1 is again available to receive a new test container 3.

Thus, the leak testing method 100 for a test container 3 exhibits numerous advantages.

This is because, unlike other gas species used as tracers for detecting leaks such as helium, the volatility of volatile organic compounds can be used to direct to the tracer gas towards the sensor 7 or to easily evacuate the chamber 5, via a decontamination means, by simply driving the gases at atmospheric pressure.

The time needed to test a container 3 during an industrial manufacturing process is thereby greatly reduced, because only a few seconds are necessary to evacuate the residual background noise volatile organic compounds, including right after the detection of a leaking container 3.

FIG. 4 is a graphic detecting an example change in the concentration of volatile organic compounds over time in the course of a leak testing method 100 on a container 3 exhibiting a leakproofness defect.

The curse of the graph is obtained from the measurement derived from the sensor 7 of the testing device 1 of FIG. 2.

The initial instant t0 of the graph corresponds to the start of the first step 102 during which a background noise is measured. At that moment, a concentration of about 30 ppb of isobutene is measured within the measurement volume 18. This level corresponds to an acceptable background noise for the particular test conditions under which the chamber 5 is a cooling radiator with a volume of about thirty liters.

Next, the tracer gas is introduced into the test container 3 at a gas pressure greater than atmospheric pressure.

Next, beginning at instant t1, i.e. a few seconds after the start of the injection of the tracer gas into the internal space 8 of the container 3, it is observed that the measurement of the volatile organic compound concentration increases significantly.

The increasing the volatile organic compound concentration is linear, which is characteristic of a leak.

The variation in the volatile organic compound concentration is therefore determined over the course of thirty test seconds, so as to determine the slope of the curve.

Next, at t2, the injection of tracer gas is stopped.

Preferentially, the injection of the tracer gas is stopped once the slope of the curve reaches a predefined flow, so as to quickly stop the injection in the event of the noted leak and thereby to avoid worsening the background noise level too much.

If appropriate, the operation of the mixing means 20 present within the chamber 5 may also be stopped.

It is observed that the volatile organic compound concentration remains nearly constant.

Next, as is visible in the graph, a few microseconds after the initial instant t0, a step of decontamination 106 is activated (at t3).

Naturally, the step of decontamination 106 may be activated well before this time t3.

The drop in volatile organic compound concentrations is clearly distinguished.

Finally, at t4, or only after a few test minutes, the volatile organic compound concentration has fallen back down to its initial value.

The test container 3 may therefore be removed the chamber 5.

It is therefore observed that the leak testing method 100 is a high-sensitivity method, which is simple and fast to implement, low-cost and applicable to industrial processes.

Furthermore, the result of the measurement is reliable and reproducible. It is not sensitive to temperature of the walls 12 of the container 3.

Additionally, the testing device 1 does not require any pumping unit, so it is simple to implement and consumes little power.

The invention claimed is:

1. A leak testing method for a test container, comprising the steps of:

measuring background noise within a chamber at atmospheric pressure with a trace sensor of volatile organic compounds that exhibit a measurement sensitivity less than or on the order of 1 ppb, removing pollution from an internal atmosphere of the chamber when the measurement of the background noise is greater than a predetermined threshold, mixing the internal atmosphere of the chamber to homogenize a composition of the internal atmosphere receiving a container that defines a bounded internal space within which a volatile organic compound is present, measuring a concentration of volatile organic compounds within the atmospheric-pressure chamber with the trace sensor of the volatile organic compounds, and comparing the measurement of the background noise to the measurement of the concentration of the volatile organic compounds to detect the leak in the test container.

2. The testing method according to claim 1, further comprising the step of injecting a trace gas comprising a volatile organic compound into the container at a gas pressure greater than the atmospheric pressure.

3. The testing method according to claim 1, wherein the tracer gas comprises a neutral gas with a concentration less than 6% of at least one volatile organic compound.

4. The testing method according to claim 3, wherein the tracer gas comprises a natural gas with a concentration between 1% and 6% isobutene.

5. The testing method according to claim 1, further comprising the step of calibrating the trace sensor of the volatile organic compounds with respect to a volume of the chamber.

6. A device for testing a test container for leaks, comprising:
an atmospheric-pressure chamber configured to receive the test container, and
a trace sensor of volatile organic compounds exhibiting a measurement sensitivity less than or on the order of 1 ppb, with a fluid connection to the chamber, a decontamination means, a means for mixing the gases, and a processing unit operable to compare the measurement results of the sensor to provide information on the leak-proofness of the test container.

7. The device according to claim 6, further comprising a pressurization system configured to inject a tracer gas into the test container at a pressure greater than the atmospheric pressure of the chamber.

8. The device according to claim 6, wherein the decontamination means comprises a decontamination chamber equipped with a valve and a volatile organic compound filter, the valve being configured to isolate the internal atmosphere of the chamber from the volatile organic compound filter.

9. The device according to claim 8, wherein the decontamination means comprises an additional decontamination chamber comprising a valve, a gas driving means, and a volatile organic compound filter, the two decontamination chambers being configured to circulate a cleaning gas from a gas inlet of a first decontamination chamber to a gas outlet of a second decontamination chamber.

10. The device according to claim 6, wherein the chamber comprises a bypass line onto which the trace sensor of volatile organic compounds is connected.

* * * * *